United States Patent
Hirstein et al.

(10) Patent No.: US 12,215,820 B1
(45) Date of Patent: Feb. 4, 2025

(54) COMPUTER CASE MOUNT

(71) Applicant: CKnapp Sales, Inc., Goodfield, IL (US)

(72) Inventors: Cody Ryan Hirstein, Eureka, IL (US); Brandon Meyer, Normal, IL (US)

(73) Assignee: Cknapp Sales, Inc., Goodfield, IL (US)

( * ) Notice: Subject to any disclaimer, the term of this patent is extended or adjusted under 35 U.S.C. 154(b) by 288 days.

(21) Appl. No.: 17/564,172

(22) Filed: Dec. 28, 2021

(51) Int. Cl.
*F16M 11/28* (2006.01)

(52) U.S. Cl.
CPC .................... *F16M 11/28* (2013.01)

(58) Field of Classification Search
CPC .................................................. F16M 11/28
USPC ............ 248/229.14, 229.12, 229.22, 229.24, 248/228.3, 228.5, 231.61, 231.41
See application file for complete search history.

(56) References Cited

U.S. PATENT DOCUMENTS

| | | | |
|---|---|---|---|
| 5,131,620 A * | 7/1992 | Boundy | G06F 1/183 248/225.11 |
| 5,683,066 A * | 11/1997 | McCann | A47B 21/0314 248/295.11 |
| 5,775,656 A * | 7/1998 | Roberts | A47B 96/063 248/250 |
| 6,098,944 A * | 8/2000 | Pangborn | A47B 96/06 248/316.1 |
| 6,340,145 B1 * | 1/2002 | Tagami | F16M 13/022 108/26 |
| 6,402,111 B1 * | 6/2002 | Stewart | A47B 21/0314 248/316.1 |
| 8,141,836 B2 * | 3/2012 | Saez | F16M 13/02 248/295.11 |
| 8,453,985 B2 * | 6/2013 | Peng | G06F 1/181 361/796 |
| 8,500,077 B2 * | 8/2013 | Smed | A47B 21/03 108/143 |
| 8,714,502 B1 * | 5/2014 | Davis | E04B 9/006 248/228.3 |
| 9,045,918 B2 * | 6/2015 | Sargent | A01G 20/47 |
| 11,131,332 B2 * | 9/2021 | Huang | F16B 2/065 |

FOREIGN PATENT DOCUMENTS

KR          200409319 Y1 *   2/2006

OTHER PUBLICATIONS

"CPU Holder Desk Clamp Mount, Ziotek, ZT1080145," Website <https://www.cyberguys.com/product-details/?productid=1761>, 4 pages, Accessed May 27, 2021.
Black Under Desk and Wall PC Mount: Instruction Manual; Mar. 5, 2020; 8 pages; VIVO; Goodfield, Illinois.

* cited by examiner

*Primary Examiner* — Kimberly T Wood
(74) *Attorney, Agent, or Firm* — Lund IP, PLLC

(57) ABSTRACT

A computer case mount includes an adjustable frame configured to receive a computer case, The frame includes a height adjustment mechanism providing a selectable height adjustment range for the computer case and a width adjustment mechanism providing a selectable width adjustment range for the computer case. The computer case mount further includes a clamp connected to the adjustable frame and configured to attach over an edge of a worksurface.

25 Claims, 7 Drawing Sheets

COMPUTER CASE MOUNT

TECHNICAL FIELD

This disclosure relates to computer case mounts.

BACKGROUND

Computer case mounts are used to attach a computer case to existing furniture in a user's workspace. As an example, some computer case mounts may be designed to mount a computer case to the underside of a desktop.

BRIEF SUMMARY

As disclosed herein, a computer case mount is designed to mount a computer case to the underside of a desktop, table, adjustable desktop or other worksurface. Example computer case mounts disclosed herein include a clamp mechanism configured to clamp over an edge of the worksurface. Examples facilitate clamping from an upper side of the worksurface, rather than from underneath the worksurface.

In one example, a computer case mount includes an adjustable frame configured to receive a computer case, The frame includes a height adjustment mechanism providing a selectable height adjustment range for the computer case and a width adjustment mechanism providing a selectable width adjustment range for the computer case. The computer case mount further includes a clamp connected to the adjustable frame and configured to attach over an edge of a worksurface.

In another example, a system includes a computer case and a computer case mount. The computer case mount includes an adjustable frame configured to receive a computer case, The frame includes a height adjustment mechanism providing a selectable height adjustment range for the computer case and a width adjustment mechanism providing a selectable width adjustment range for the computer case. The computer case mount further includes a clamp connected to the adjustable frame and configured to attach over an edge of a worksurface.

DETAILED DESCRIPTION

Figure 1A:
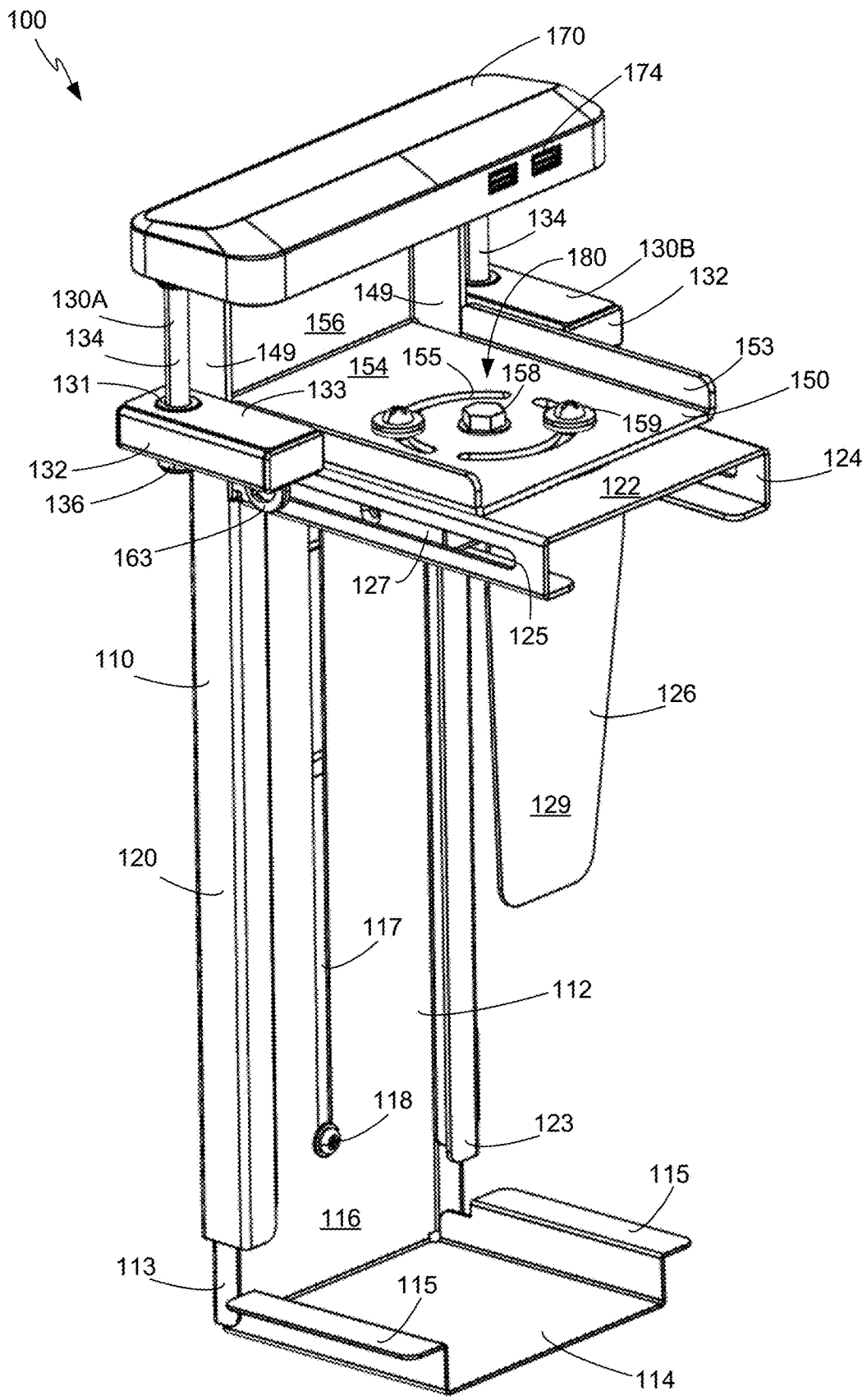
FIGS. 1A-1D illustrate a computer case mount including clamp mechanism to facilitate mounting the computer case mount to the underside of the worksurface as well as a swivel that allows adjustment of the orientation of a mounted a computer case after clamping.
Figure 1B:
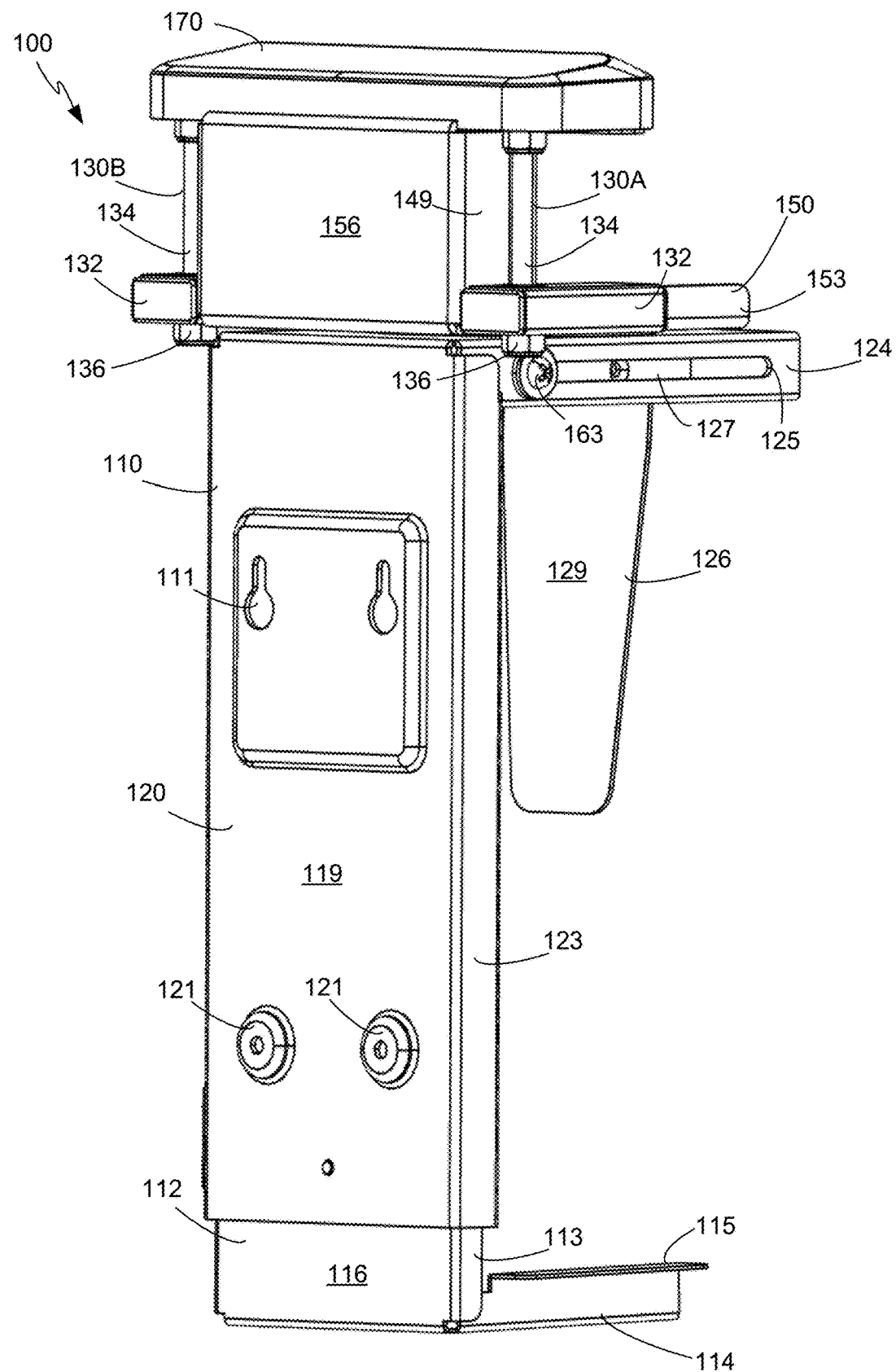
Figure 1C:
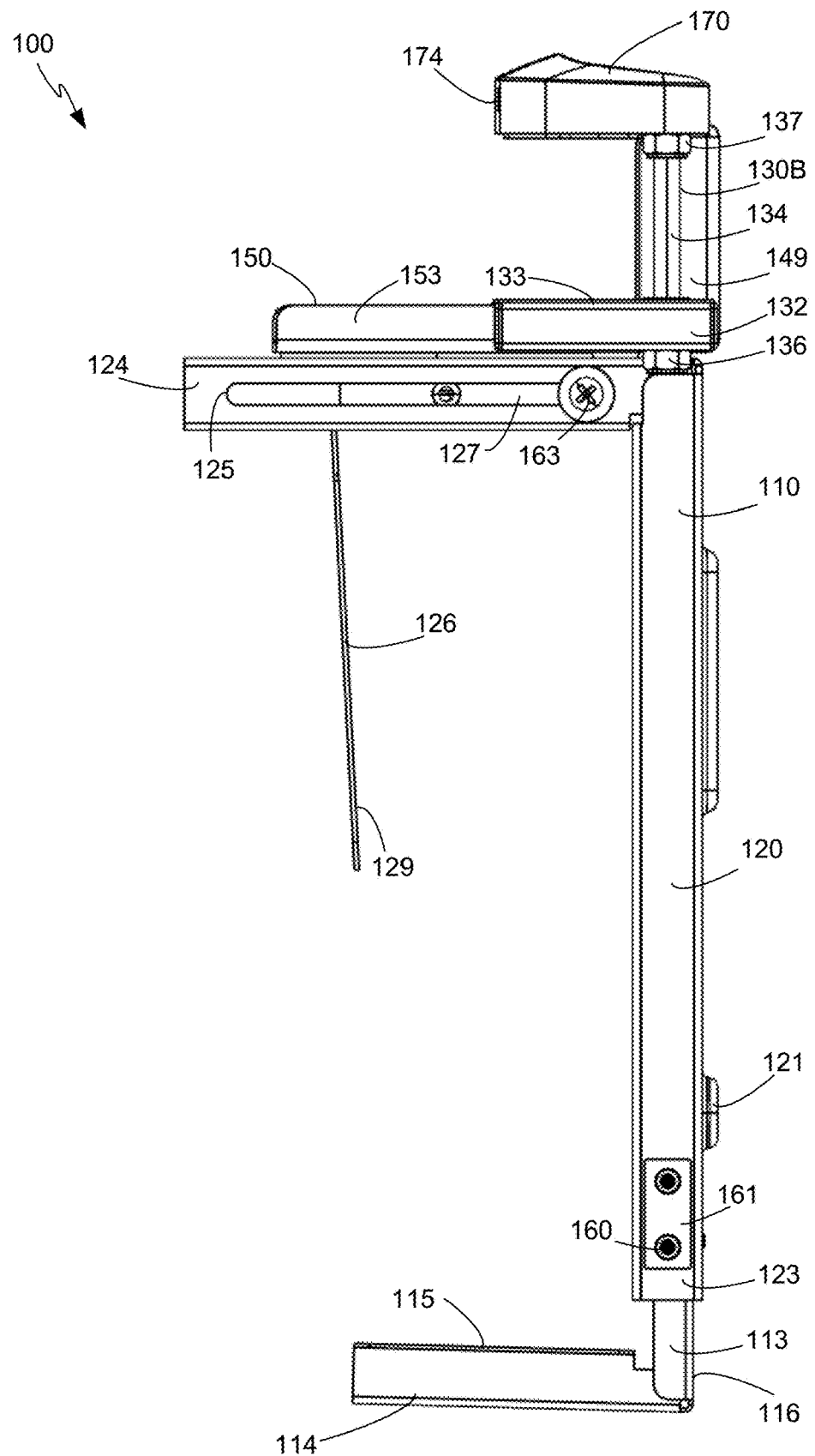
Figure 1D:
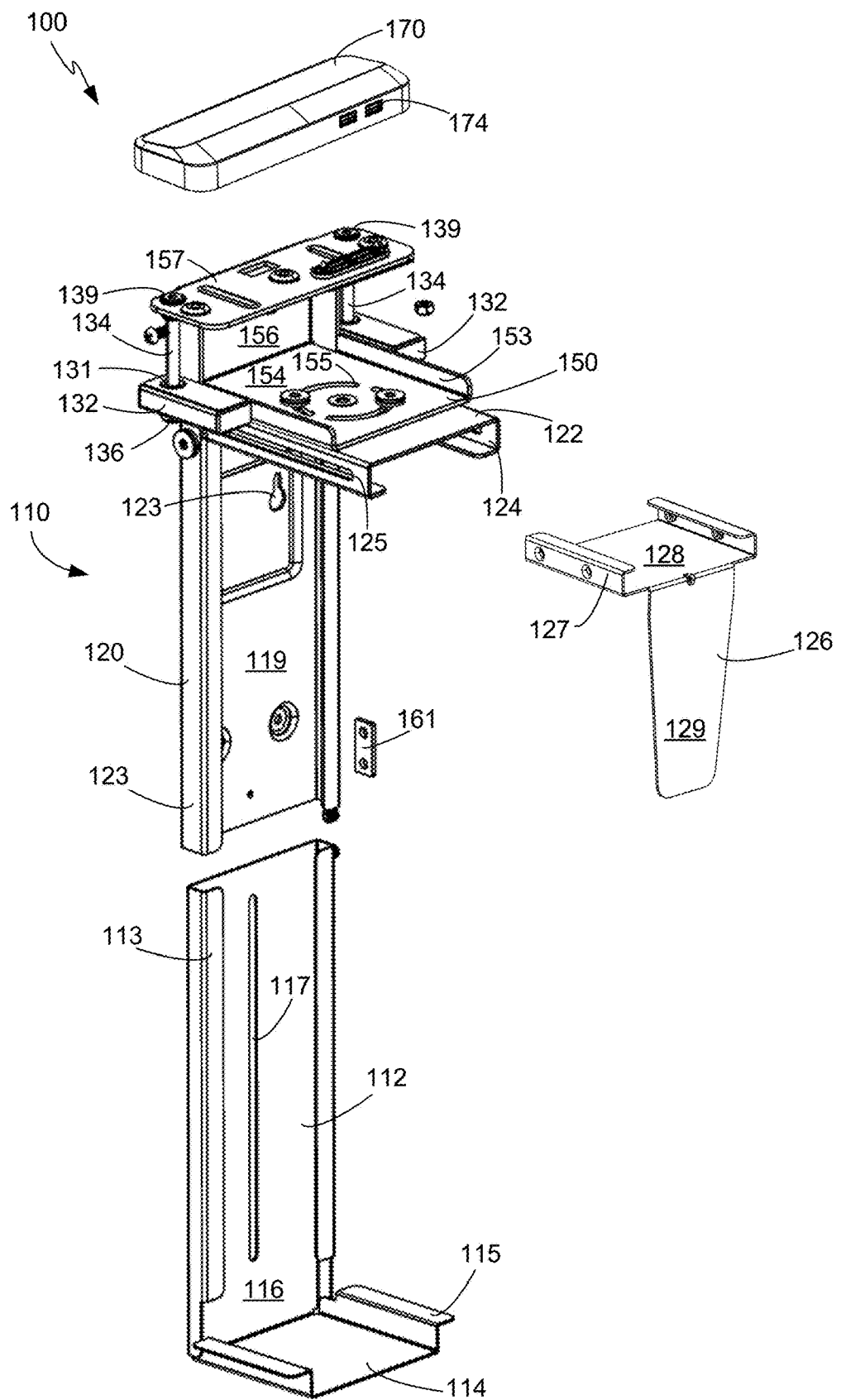

FIGS. 1A-1D illustrate a computer case mount 100. Specifically, FIG. 1A illustrates a side perspective view of computer case mount 100, FIG. 1B illustrates a rear perspective view of computer case mount 100, FIG. 1C illustrates a side view of computer case mount 100, and FIG. 1D illustrates an exploded side perspective view of computer case mount 100.

Figure 2A:
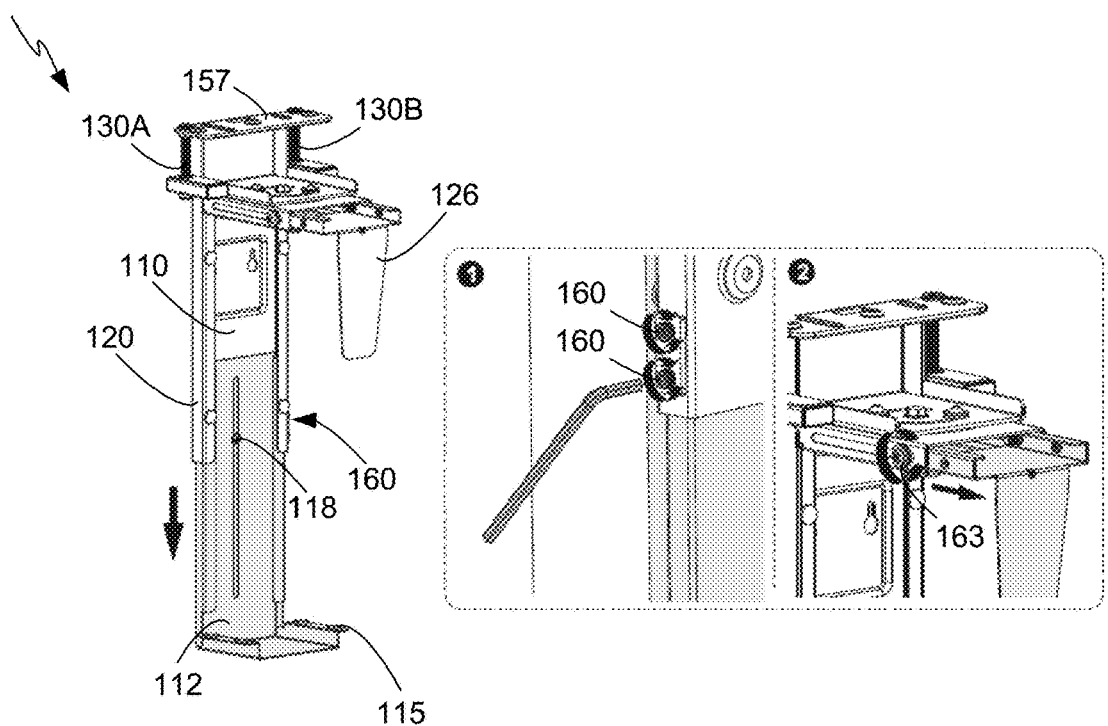
FIGS. 2A-2E illustrate techniques for mounting a computer case on the underside of the worksurface of a desk using the computer case mount of FIGS. 1A-1D.
Figure 2B:
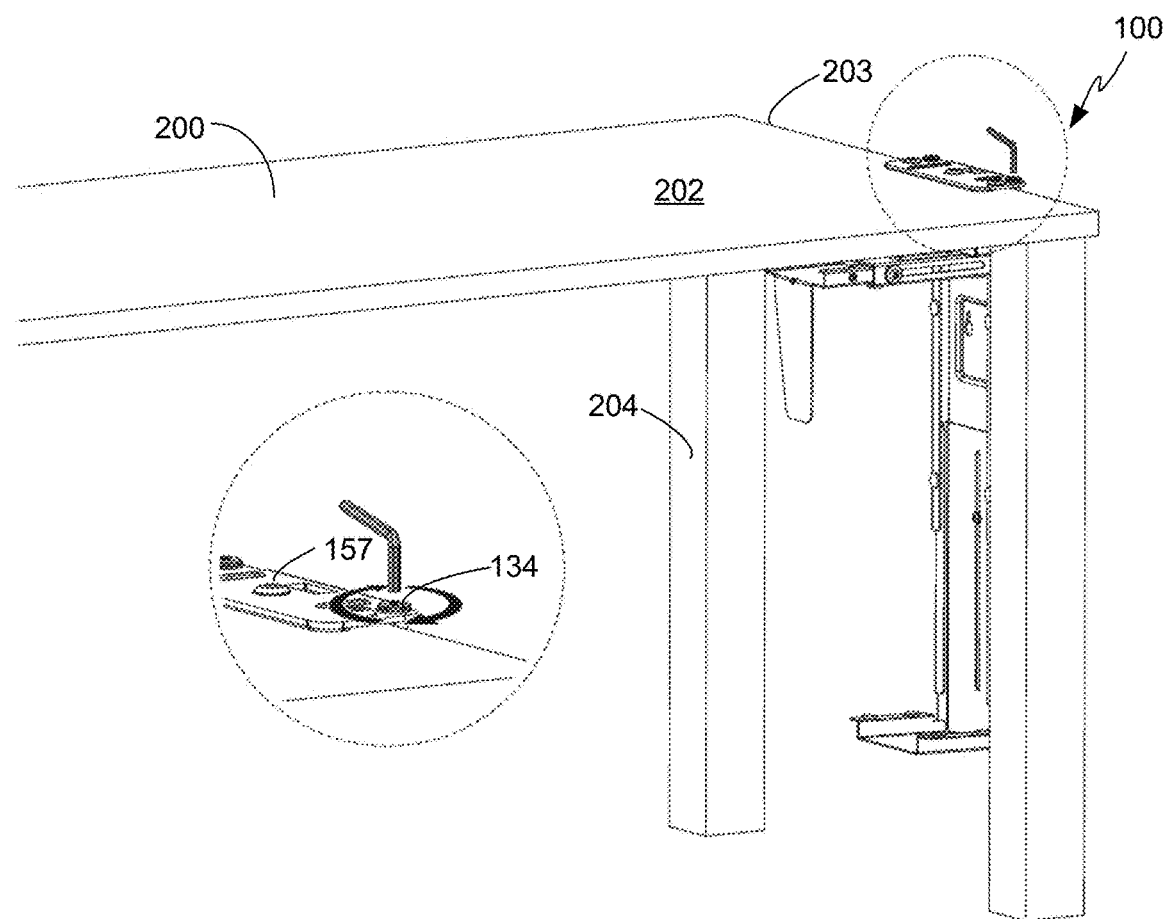
Figure 2C:
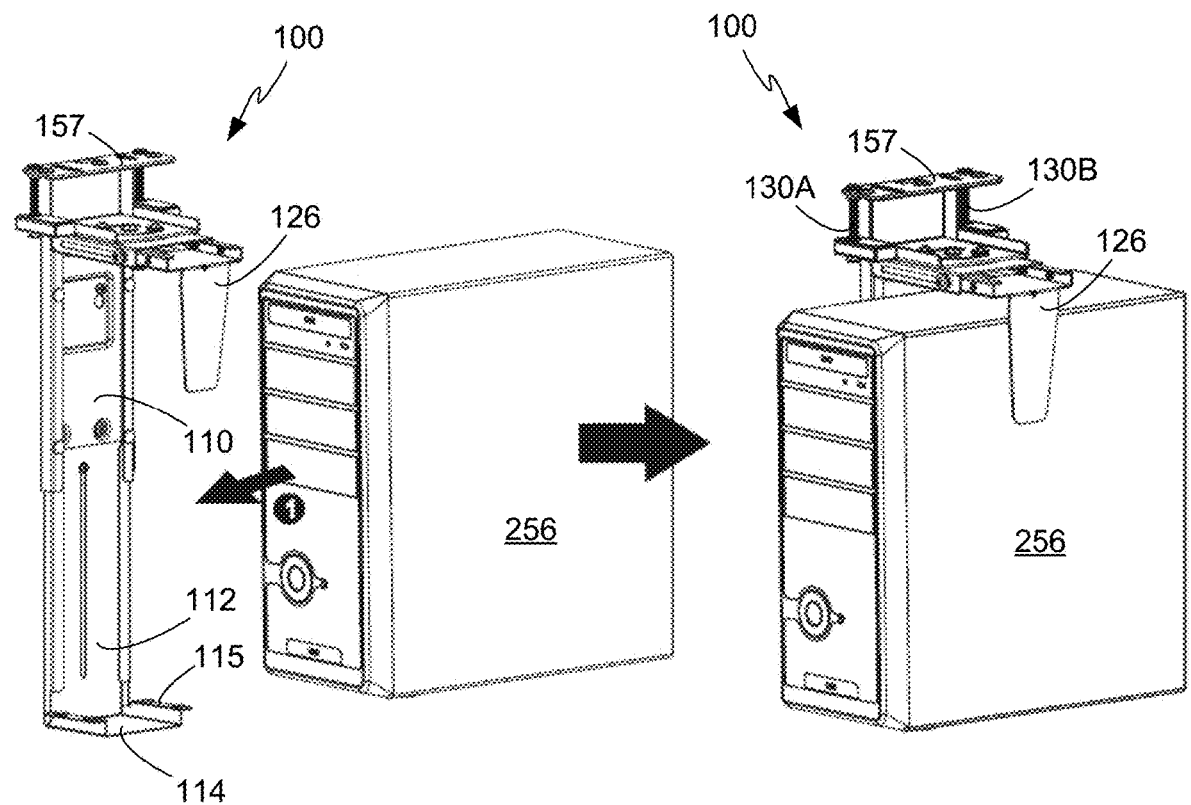

Computer case mount 100 includes an adjustable frame 110 configured to receive a computer case, such as computer case 256 (FIG. 2C). The frame 110 includes a height adjustment mechanism providing a selectable height adjustment range for the computer case 256, and a width adjustment mechanism providing a selectable width adjustment range for the computer case 256. As used herein, relative terms such as height, width, flat, parallel, vertical, and horizontal are used to broadly describe the relative operation and function of a component within a larger system. Such terms should be considered broadly and only should only be considered limiting to the extent required to maintain the practical function the described component.

Clamps 130A, 130B (collectively, "clamps 130"), are configured to attach over an edge of a worksurface to secure computer case mount 100 to the underside of the worksurface. Computer case mount 100 further includes a swivel 180 rotatably connecting the adjustable frame 110 to the clamps 130. Clamps 130 operate in parallel to secure clamp bracket 150 to an edge of a worksurface. Clamp bracket 150 includes a top plate 157 configured to contact a first side of the worksurface, a rear plate 156 with side flanges 149, and a clamp-side swivel plate 154 with side flanges 153. The top plate 157 is configured to contact a first side of the worksurface with separate adjustable clamp members 132 of clamps 130 operating in parallel to contact an opposing second side of the worksurface. When mounted, the adjustable clamp members 132 are positioned on the same side of the worksurface as the frame 110.

Clamp members 132 are actuated using separate clamp screws 134. The heads 139 of clamp screws 134 register with the top plate 157 and threaded shafts of clamp screws 134 pass through the top plate 157 and engage a threaded hole 131 in adjustable clamp member 132. Each clamp screw 134 extends through a threaded hole 131 of the corresponding adjustable clamp member 132 such that rotating the head 139 of the clamp screw 134 functions to adjust a spacing between the top plate 157 and the adjustable clamp member 132. When positioned over the edge of a worksurface, top plate 157 contacts a first side of the worksurface while adjustable clamp member 132 is pulled toward the other side by tightening the clamp screw 134 as the threaded shaft of the clamp screw 134 engages the threaded hole 131. Clamp members 132 register with the adjacent flange 153 to avoid rotating with the rotation of clamp screw 134. Optional lock nuts 136, 137 are installed on the threaded shafts of clamp screws 134 and prevent clamp screws 134 from falling out of top plate 157 and prevent clamp members 132 from falling off the clamp screws 134.

The swivel 180 includes a clamp-side swivel plate 154, which is fixed to the top plate 157 as both the top plate 157 and the clamp-side swivel plate 154 are part of clamp bracket 150. The swivel 180 further includes a frame-side swivel plate 122 fixed to the adjustable frame 110, and a center pin 158 extending through the clamp-side swivel plate 154 and the frame-side swivel plate 122. The clamp-side swivel plate 154 forms a pair of radial through-holes 155 with the center pin 158 at a central axis of the radial through-hole. The swivel 180 further includes radial pins 159 fixed to the frame-side swivel plate 122 and extending through the radial through-holes 155 to provide a more secure connection between the clamp-side swivel plate 154 and the frame-side swivel plate 122. The radial pins 159 also limit rotation of frame-side swivel plate 122 relative to clamp-side swivel plate 154 as they contact the ends of the radial through-holes 155.

The height adjustment mechanism of the adjustable frame 110 includes an L-shaped rear bracket 120 forming a frame-side swivel plate 122 rotatably connected to the clamps 130 by the swivel 180, and an L-shaped bottom bracket 112 slidably engaged with the L-shaped rear bracket 120. In the specific example of the adjustable frame 110, the L-shaped rear bracket 120 forms parallel flanges 123 forming vertical channels that slidably receive flanges 113 of the L-shaped bottom bracket 112.

The width adjustment mechanism of the adjustable frame 110 includes the L-shaped rear bracket 120, and an L-shaped front bracket 126 slidably engaged with the L-shaped rear bracket 120 adjacent the frame-side swivel plate 122. In the specific example of adjustable frame 110, the L-shaped rear bracket 120 forms parallel flanges 124 representing horizontal channels that slidably receive flanges 127 of the L-shaped front bracket 126.

L-shaped bottom bracket 112 includes a bottom side 114 with flanges 115 to support a computer case. L-shaped bottom bracket 112 includes a bottom side 114 further includes a rear side 116 with flanges 113 and a vertical slot 117.

L-shaped front bracket 126 includes a top side 128 with flanges 127 and a flat front side 129 configured to registered within a computer case contained within the adjustable frame 110.

L-shaped rear bracket 120 includes a rear side 119 with vertical flanges 123 to configured to slidably mate with flanges 113 of L-shaped bottom bracket 112. L-shaped rear bracket 120 further includes a frame-side swivel plate 122 with horizontal flanges 124 configured to slidably mate with flanges 127 of the L-shaped front bracket 126. Rear side 119 also forms optional bumpers 121 and hanger holes 111. Bumpers 121 and hanger holes 111 facilitate mounting adjustable frame 110 without clamps 130, i.e., by positioning hanger holes 111 over screws or nails extending from a vertical planar surface, such as a wall or desk leg. In such a mounting configuration, bumpers 121 register with the vertical planar surface to provide a space between rear side 119 and the vertical surface.

The components of adjustable frame 110, including L-shaped bottom bracket 112, L-shaped rear bracket 120, L-shaped front bracket 126, and clamp bracket 150 may be formed from sheet metal by cutting and bending. Other manufacturing techniques may also be used including machining and/or molding reinforced plastics.

Snap-fit cover 170 extends over the top plate 157. In some examples, snap-fit cover 170 may be a molded plastic component. Some examples include one or more computer peripheral ports 174 extending through the cover 170. Different examples may include any computer peripheral port or combination of computer peripheral ports. Example computer peripheral ports suitable for inclusion in cover 170 include: a universal serial bus (USB) port, a USB type A port, a USB type C port, an audio port, a Toshiba Link port (TOSLINK), a video port, a digital video interface (DVI) port, a DisplayPort, a mini DisplayPort, a high definition multimedia interface (HDMI) port, a mini HDMI port, a micro HDMI port, an ethernet port, an RJ-45 port, an e-SATA port, a Secure Digital (SD) memory card reader, a miniSD memory card reader, and a microSD memory card reader.

FIGS. 2A-2E illustrate techniques for installing a computer case mount 100 on the underside of worksurface 202 of desk 200, and for mounting computer case 256 within the computer case mount 100.

As shown in FIG. 2A, setscrews 160 are loosened to allow L-shaped bottom bracket 112 to slide vertically relative to L-shaped rear bracket 120. Likewise, setscrews 163 are loosened to allow L-shaped front bracket 126 to slide horizontally relative to L-shaped rear bracket 120.

With the setscrews 160 loosened, the user adjusts the height as desired to fit computer case 256. Then the setscrews 160 are tightened to set the adjusted height of the adjustable frame 110. Setscrews 160 pass through a metal plate 161, which serves to distribute the force of setscrews 160 over a larger area and through threaded holes in flange 123 of L-shaped rear bracket 120. When tightened, the setscrews 160 contact flange 113 of L-shaped bottom bracket 112 to set the height of the adjustable frame 110. Similarly, setscrew 118 passes through slot 117 in the rear side of L-shaped bottom bracket 112 to engage a threaded hole in the rear side of L-shaped rear bracket 120. Tightening setscrew 118 pinches L-shaped bottom bracket 112 between the head of setscrew 118 and L-shaped rear bracket 120 to further secure L-shaped bottom bracket 112 against L-shaped rear bracket 120 at the selected height.

As shown in FIG. 2B, with the height of the adjustable frame 110 set as desired, a user positions the top plate 157 over the worksurface 202 on the edge 203 of desk 200. Worksurface 202 is held up by legs 204, leaving a space underneath for adjustable frame 110. Next, the user tightens adjustments screws 134 to tighten adjustable clamp members 132 against the underside of worksurface 202. The pads 133 of clamp members 132 increase friction between clamp members 132 and worksurface 202 and mitigate marking of the underside of worksurface 202. For example, pads may be formed from a foam, rubber and/or polymer material.

As shown in FIG. 2C, the user positions computer case 256 within adjustable frame 110 such that it is supported by flanges 115 of the bottom side 114 of L-shaped bottom bracket 112, forming an assembly including computer case 256 and computer case mount 100. Flanges 115 may include optional pads to increase friction between flanges 115 and computer case 256 and mitigate marking of the underside of computer case 256.

Figure 2D:
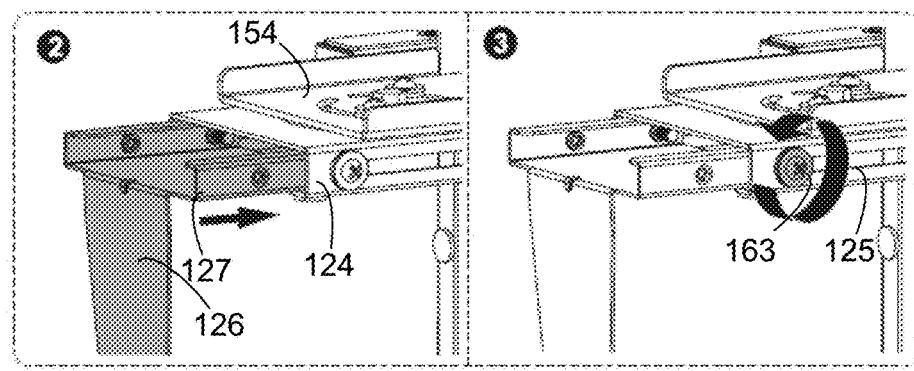

As shown in FIG. 2D, with computer case 256 within adjustable frame 110, the user positions L-shaped front bracket 126 relative to the L-shaped rear bracket 120 to register front side 129 with computer case 256. The user then tightens setscrews 163 to fix the width adjustment mechanism of adjustable frame 110. Each setscrew 163 passes through slot 125 of flange 124 of the L-shaped rear bracket 120 and through a threaded hole within the flange 127 of L-shaped front bracket 126. Tightening the setscrew 163 pinches flange 124 of L-shaped rear bracket 120 between the head of the setscrew 163 and the flange 127 of L-shaped front bracket 126 to fix the position of L-shaped front bracket 126 relative to the L-shaped rear bracket 120.

Figure 2E:
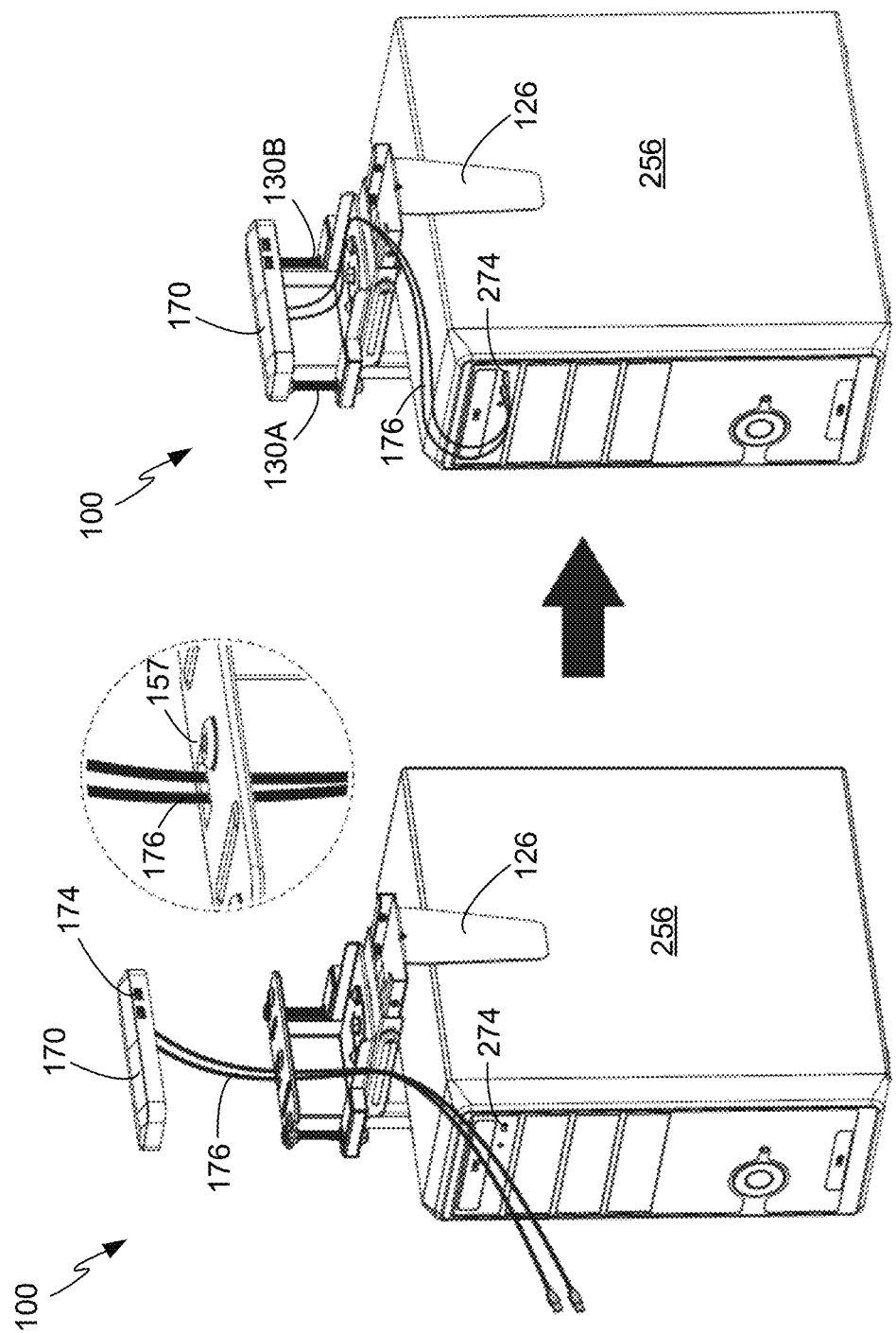

As shown in FIG. 2E, after mounting computer case 256 within the adjustable frame 110 of computer case mount 100, the user positions the snap-fit cover 170 over the top plate 157 and snaps it in place. In the illustrated example, the snap-fit cover 170 includes computer peripheral ports 174. To connect the computer peripheral ports 174 to the corresponding computer peripheral ports 274 of computer case 256, the user routes computer peripheral cables 176 through top plate 157 and to the corresponding computer peripheral ports 274 of computer case 256. With computer peripheral cables 176 connected to computer peripheral ports 274, a user can access the computer peripheral ports 274 via the computer peripheral ports 174 of the snap-fit cover 170. Because computer case 256 is underneath worksurface 202 of desk 200, computer peripheral ports 174 of the snap-fit cover 170 may be more easily accessible by the user than the computer peripheral ports 274 of computer case 256.

Computer case mount 100 may provide one or more advantages compared to other computer case mounts. For example, clamps 130 are tightened by turning camp screws 134 from an upper side of the worksurface, such as worksurface 202 of desk 200, rather than from underneath the worksurface. As another example, swivel 180 facilitates adjustment of a computer case position after securing clamps 130 to the worksurface.

The specific techniques for computer case mounts, including techniques described with respect to computer case mount 100, are merely illustrative of the general inventive concepts included in this disclosure as defined by the following claims.

What is claimed is:

1. A computer case mount comprising:
   an adjustable frame configured to receive a computer case,
   wherein the frame includes a height adjustment mechanism providing a selectable height adjustment range for the computer case,
   wherein the frame includes a width adjustment mechanism providing a selectable width adjustment range for the computer case; and
   a clamp connected to the adjustable frame and configured to attach over an edge of a worksurface, wherein the clamp includes:
      a top plate configured to contact a first side of the worksurface;
      an adjustable clamp member configured to contact an opposing second side of the worksurface; and
      a clamp screw including a head that registers with the top plate and a threaded shaft that passes through the top plate and engages the adjustable clamp member,
      wherein the clamp screw extends through a threaded hole of the adjustable clamp member such that rotating the head of the clamp screw functions to adjust a spacing between the top plate and the adjustable clamp member,
      wherein the adjustable clamp member is configured to be positioned on the same side of the worksurface as the frame.

2. The computer case mount of claim 1, further comprising a snap-fit cover over the top plate.

3. The computer case mount of claim 1, wherein the clamp is a first clamp, the computer case mount further including a second clamp that operates in parallel to the first clamp, wherein the first and the second clamps include:
   a shared top plate configured to contact the first side of the worksurface;
   separate adjustable clamp members each configured to contact the opposing second side of the worksurface; and
   separate clamp screws including heads that register with the top plate and threaded shafts that pass through the top plate and engage a respective adjustable clamp member.

4. The computer case mount of claim 3, further comprising a swivel rotatably connecting the adjustable frame to the clamp.

5. The computer case mount of claim 1, wherein a threaded shaft of the clamp screw projects on the same side of the worksurface as the frame.

6. The computer case mount of claim 1, further comprising a swivel rotatably connecting the adjustable frame to the clamp.

7. The computer case mount of claim 6, wherein the swivel includes:
   a clamp-side swivel plate fixed to the top plate and adjacent to the adjustable clamp member;
   a frame-side swivel plate fixed to the adjustable frame; and
   a center pin extending through the clamp-side swivel plate and the frame-side swivel plate.

8. The computer case mount of claim 7,
   wherein the clamp-side swivel plate forms a radial through-hole with the center pin at a central axis of the radial through-hole, and
   wherein the swivel further includes a radial pin fixed to the frame-side swivel plate and extending through the radial through-hole.

9. The computer case mount of claim 6, wherein the height adjustment mechanism of the adjustable frame includes:
   an L-shaped rear bracket forming a frame-side swivel plate rotatably connected to the clamp by the swivel; and
   an L-shaped bottom bracket slidably engaged with the L-shaped rear bracket opposite the frame-side swivel plate.

10. The computer case mount of claim 9, wherein the L-shaped rear bracket forms parallel vertical channels that slidably receive the L-shaped bottom bracket.

11. The computer case mount of claim 9, wherein the width adjustment mechanism of the adjustable frame includes:
    the L-shaped rear bracket forming the frame-side swivel plate; and
    an L-shaped front bracket slidably engaged with the L-shaped rear bracket adjacent the frame-side swivel plate.

12. The computer case mount of claim 11, wherein the L-shaped rear bracket forms parallel horizontal channels that slidably receive the L-shaped front bracket.

13. A computer case mount comprising:
    an adjustable frame configured to receive a computer case,
    wherein the frame includes a height adjustment mechanism providing a selectable height adjustment range for the computer case,
    wherein the frame includes a width adjustment mechanism providing a selectable width adjustment range for the computer case;
    a clamp connected to the adjustable frame and configured to attach over an edge of a worksurface, wherein the clamp includes:
       a top plate configured to contact a first side of the worksurface;
       an adjustable clamp member configured to contact an opposing second side of the worksurface; and
       a clamp screw including a head that registers with the top plate and a threaded shaft that passes through the top plate and engages the adjustable clamp member,
       wherein the adjustable clamp member is configured to be positioned on the same side of the worksurface as the frame; and
    a swivel rotatably connecting the adjustable frame to the clamp.

14. The computer case mount of claim 13, wherein the swivel includes:
    a clamp-side swivel plate fixed to the top plate and adjacent to the adjustable clamp member;
    a frame-side swivel plate fixed to the adjustable frame; and
    a center pin extending through the clamp-side swivel plate and the frame-side swivel plate.

15. The computer case mount of claim 14,
wherein the clamp-side swivel plate forms a radial through-hole with the center pin at a central axis of the radial through-hole, and
wherein the swivel further includes a radial pin fixed to the frame-side swivel plate and extending through the radial through-hole.

16. The computer case mount of claim 13, wherein the height adjustment mechanism of the adjustable frame includes:
an L-shaped rear bracket forming a frame-side swivel plate rotatably connected to the clamp by the swivel; and
an L-shaped bottom bracket slidably engaged with the L-shaped rear bracket opposite the frame-side swivel plate.

17. The computer case mount of claim 16, wherein the L-shaped rear bracket forms parallel vertical channels that slidably receive the L-shaped bottom bracket.

18. The computer case mount of claim 16, wherein the width adjustment mechanism of the adjustable frame includes:
the L-shaped rear bracket forming the frame-side swivel plate; and
an L-shaped front bracket slidably engaged with the L-shaped rear bracket adjacent the frame-side swivel plate.

19. The computer case mount of claim 18, wherein the L-shaped rear bracket forms parallel horizontal channels that slidably receive the L-shaped front bracket.

20. An assembly comprising:
a computer case; and
a computer case mount comprising:
an adjustable frame securing the computer case,
wherein the frame includes a height adjustment mechanism providing a selectable height adjustment range for the computer case,
wherein the frame includes a width adjustment mechanism providing a selectable width adjustment range for the computer case;
a clamp connected to the adjustable frame and configured to attach over an edge of a worksurface, wherein the clamp includes:
a top plate configured to contact a first side of the worksurface;
an adjustable clamp member configured to contact an opposing second side of the worksurface; and
a clamp screw including a head that registers with the top plate and a threaded shaft that passes through the top plate and engages the adjustable clamp member,
wherein the adjustable clamp member is configured to be positioned on the same side of the worksurface as the frame; and
a swivel rotatably connecting the adjustable frame to the clamp.

21. The assembly of claim 20, further comprising a snap-fit cover over the top plate.

22. The assembly of claim 20, wherein the swivel includes:
a clamp-side swivel plate fixed to the top plate and adjacent to the adjustable clamp member;
a frame-side swivel plate fixed to the adjustable frame; and
a center pin extending through the clamp-side swivel plate and the frame-side swivel plate.

23. The assembly of claim 22, wherein the height adjustment mechanism of the adjustable frame includes:
an L-shaped rear bracket forming a frame-side swivel plate rotatably connected to the clamp by the swivel; and
an L-shaped bottom bracket slidably engaged with the L-shaped rear bracket opposite the frame-side swivel plate,
wherein the width adjustment mechanism of the adjustable frame includes:
the L-shaped rear bracket; and
an L-shaped front bracket slidably engaged with the L-shaped rear bracket adjacent the frame-side swivel plate.

24. The assembly of claim 20, wherein the clamp is a first clamp, the computer case mount further including a second clamp that operates in parallel to the first clamp, wherein the first and the second clamps include:
a shared top plate configured to contact the first side of the worksurface;
separate adjustable clamp members each configured to contact the opposing second side of the worksurface; and
separate clamp screws including heads that register with the top plate and threaded shafts that pass through the top plate and engage a respective adjustable clamp member.

25. The assembly of claim 20, wherein a threaded shaft of the clamp screw projects on the same side of the worksurface as the frame.

* * * * *